UNITED STATES PATENT OFFICE.

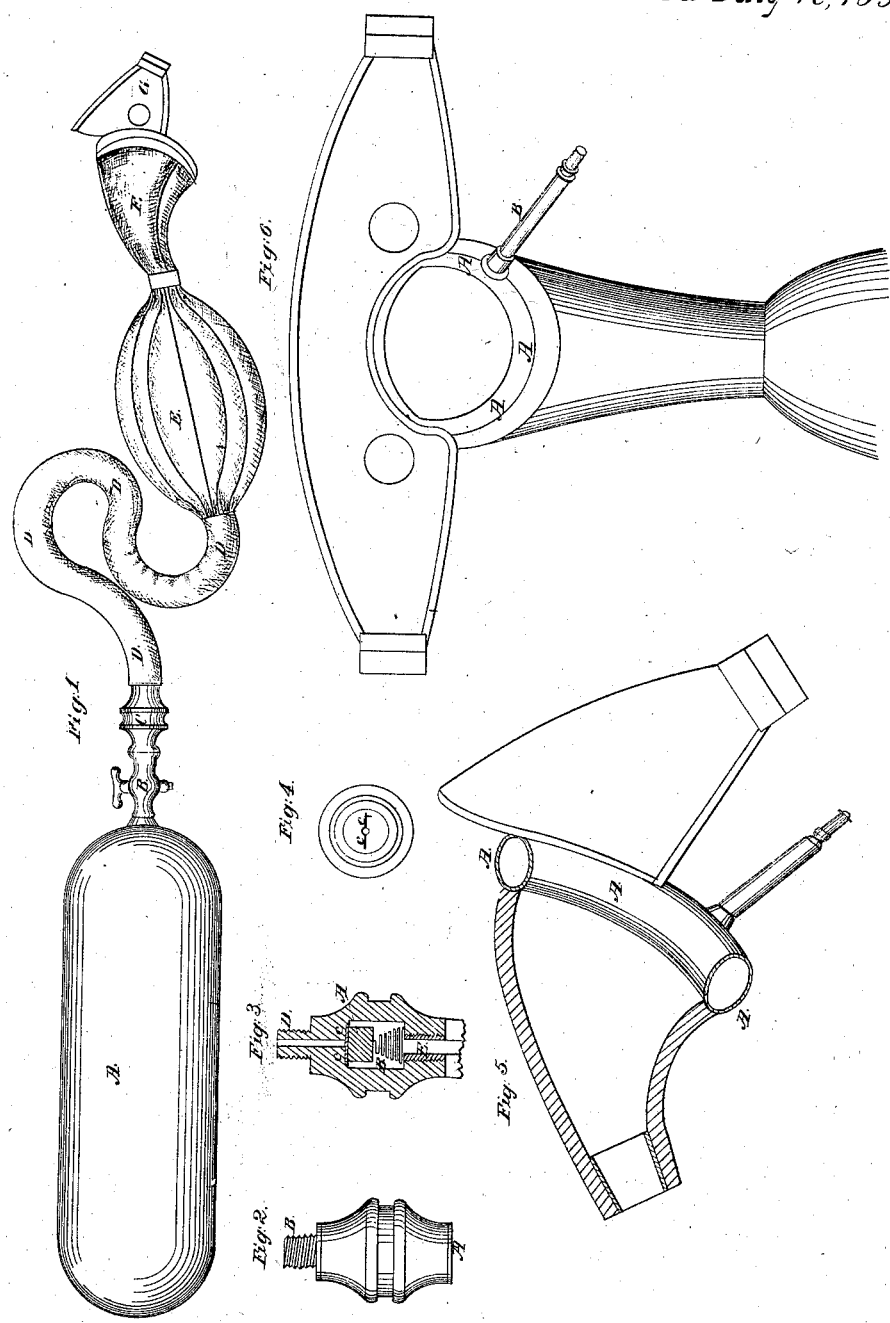

BENJ. I. LANE, OF CAMBRIDGE, MASSACHUSETTS.

RESPIRING APPARATUS.

Specification of Letters Patent No. 7,476, dated July 2, 1850.

*To all whom it may concern:*

Be it known that I, BENJAMIN I. LANE, of the city of Cambridge, in the county of Middlesex and State of Massachusetts, have invented a new and useful instrument called "Lane's pneumatic Life-preserver," for the purpose of breathing pure air from an air chamber into which the same has been condensed more or less, the air passing through the apparatus hereinafter particularly described, thereby enabling a person to enter buildings and vessels filled with smoke or impure air and into sewers, mines, wells, and other places filled with noxious gases or impure air, the person being protected from suffocation arising from such causes; and I do hereby declare that the following is a full, clear, and exact description of the construction and operation of the same, reference being had to the annexed drawings, making a part of this specification.

Figure 1 represents a perspective view of the whole apparatus with its several parts put together in their respective order for use.

Letter A is an air chamber made of one (or more cylinders connected with each other) made of brass copper or other tenacious substance capable of sustaining a high pressure in which air is to be condensed by means of an air pump, said cylinder being made large enough to contain from five to seven gallons, and strong enough to bear the pressure of five to seven atmospheres, the cylinders being strapped to the back of the wearer when charged—or it may be made in the form of a bag, sack, or coat, made of vulcanized rubber to be inflated with a common air bellows.

Letter B is a common stop-cock screwed to the cylinder to let the air pass out at pleasure.

Letter C is an equalizing valve (illustrated by Figs. 2, 3, 4).

Letter D is a vulcanized rubber tube containing spiral wire to preserve its tubular form when bent into any shape for the free passage of the air to the nose.

Letter E is a globular bag made of vulcanized rubber very thin and pliable to allow the air to expand before breathing made sufficiently large to contain four or five respirations.

Letter F is a nose piece (illustrated by Figs. 5 and 6) with goggles attached, made also of vulcanized rubber with a strap to fasten the same to the head; the peculiar feature of which is a tube of vulcanized rubber very thin and elastic and from its form when filled with air fitting perfectly any irregularities in the face of the wearer, preventing the ingress of external air, and separating the nose from the eyes and mouth.

Fig. 2 is a perspective view of equalizing valve screwing on the stop cock at A the rubber pipe screwing on at B.

Fig. 3 is a longitudinal section of the valve showing the structure of the interior.

Letter A is a small piece of vulcanized rubber or other substance very elastic about ⅜th of an inch in thickness.

Letter B is a spiral spring to retain the rubber in its position when expanded.

Letters C, C are two grooves into which the vulcanized rubber A is pressed by the expansion of the air in the cylinder when condensed to a greater or less degree, the rubber partially filling the grooves according to the pressure of the air thereby admitting the passage of the same quantity or volume of air through the grooves under all pressures and then through the hole marked D into the tube to the nose.

Fig. 4 is a transverse section of the valve showing the two grooves C, C, into which the rubber presses.

Fig. 5 is a longitudinal section of nose piece.

Letter A represents a view of the air tube which is made of very thin elastic rubber or other substance and being inflated packs perfectly air tight about the nose of any person to prevent the ingress of external air smoke or gas and also to stop all communication between the nose and eyes thereby enabling the wearer to breathe the same air over two or three times into the elastic bag (letter E, Fig. 1) without dimming the glasses with the breath.

Fig. 6 is an interior view of nose piece showing the air tube A, A, A &c and the tube B by means of which it is inflated.

The manner in which the apparatus is to be used is described in the following language. The air pump is to be screwed to the stop cock B (in Fig. 1,) and the cylinder A is to be charged with air, the stop cock to be turned before unscrewing the pump to retain the air in the vessel. The valve C is then to be screwed to the stop cock (the other parts D E F and G being firmly attached to the valve) the nose piece F and goggles G in Fig. 1 are to be adjusted to the nose and face being firmly strapped around the head by the elastic straps attached thereto the stop-cock B is then to be turned and the air will pass through the aperture E in Fig. 3 and press upon the elastic rubber which by means of its elasticity is so pressed into the grooves C, C, as nearly to fill them according to the force which the condensation of the air acquires by being more or less condensed. The air then passes through the tube D (Fig. 1,) into the thin bag E, where it expands to its original bulk and is received into the lungs through the nose piece and nose. After being expired into the bag two or three times it is expired from the mouth which organ is left unprotected. As the quantity of air in the chamber is reduced and the pressure on the elastic rubber in the valve consequently diminished the elastic rubber recedes from the grooves C, C, leaving a larger space for the air to escape so as to supply the same quantity of air to the wearer under a high as under a low pressure. The cylinder is to be confined to the person of the wearer.

What I claim as my invention and desire to secure by Letters Patent is—

The valve represented by Figs. 2, 3, 4, made of any metallic substance; and the nose-piece represented by Figs. 5 and 6 having an air tight tube surrounding that part which is designed to fit about the nose to accommodate the features of any person, and the use of these together with a cylinder vessel, air-chamber, or bag, for the purpose of enabling a person to breathe with perfect ease, air which has been condensed more or less in any such cylinder, vessel, air-chamber or bag which is to be confined to the person of the wearer while the surrounding air is impure from any cause.

BENJN. I. LANE.

In presence of —
H. M. CHAMBERLAIN,
AMBROSE CHAMBERLAIN.